US012589616B2

(12) United States Patent
Del Guercio et al.

(10) Patent No.: US 12,589,616 B2
(45) Date of Patent: Mar. 31, 2026

(54) TIRE

(71) Applicant: BRIDGESTONE EUROPE NVSA [BE/BE], Zaventem (BE)

(72) Inventors: Gerardo Del Guercio, Rome (IT); Mattia Giustiniano, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 155 days.

(21) Appl. No.: 17/914,198

(22) PCT Filed: Mar. 26, 2021

(86) PCT No.: PCT/EP2021/058019
§ 371 (c)(1),
(2) Date: Sep. 23, 2022

(87) PCT Pub. No.: WO2021/198105
PCT Pub. Date: Oct. 7, 2021

(65) Prior Publication Data
US 2023/0115477 A1 Apr. 13, 2023

(30) Foreign Application Priority Data
Mar. 30, 2020 (EP) .................................... 20020140

(51) Int. Cl.
*B60C 11/13* (2006.01)
*B60C 11/03* (2006.01)
*B60C 11/12* (2006.01)

(52) U.S. Cl.
CPC ...... *B60C 11/1369* (2013.01); *B60C 11/0302* (2013.01); *B60C 11/0323* (2013.01);
(Continued)

(58) Field of Classification Search
CPC ............. B60C 11/1281; B60C 11/0323; B60C 11/0302; B60C 11/1369; B60C 11/1353; B60C 2011/1361
See application file for complete search history.

(56) References Cited

U.S. PATENT DOCUMENTS 5,785,782 A 7/1998 Tsuzuki
5,851,322 A * 12/1998 Hayashi .............. B60C 11/0306
152/DIG. 3
(Continued)

FOREIGN PATENT DOCUMENTS

CN 101856954 A 10/2010
CN 102753365 A 10/2012
(Continued)

OTHER PUBLICATIONS

Machine translation for Japan 06-024212 (Year: 2024).*
(Continued)

*Primary Examiner* — Steven D Maki
(74) *Attorney, Agent, or Firm* — Patterson Intellectual Property Law, PC

(57) ABSTRACT
A tyre tread (10) has a groove (12) having a snow trapping device in the form of a dam (14) in it. The dam (14) is attached to a bottom wall (16) of the groove (12), and to side walls (18, 20) of the groove (12). The dam (14) has a first, snow trapping surface (22) and a second, inclined surface (24) which face in opposite sides in the groove longitudinal direction. The second, inclined surface (24) directs the flow of water away from the bottom wall (16). A hole (32) and a sipe (34) form a passageway (30) for water through the dam (14) in the groove longitudinal direction. The passageway reduces water flow recirculation. The whole of the dam (14) is between the side walls (18, 20) of the groove (12).

8 Claims, 6 Drawing Sheets

WET PERFORMACE

(52) U.S. Cl.
CPC ...... *B60C 11/1281* (2013.01); *B60C 11/1353* (2013.01); *B60C 2011/1213* (2013.01); *B60C 2011/1361* (2013.01)

(56) References Cited

U.S. PATENT DOCUMENTS

| | | | | |
|---|---|---|---|---|
| 2012/0222788 | A1* | 9/2012 | Nishiwaki | B60C 11/0306 152/209.18 |
| 2012/0273107 | A1* | 11/2012 | Le-Hen | B60C 11/1307 152/209.21 |
| 2016/0263946 | A1* | 9/2016 | Bonnamour | B60C 11/1204 |
| 2017/0166015 | A1* | 6/2017 | Christenbury | B60C 11/1218 |

FOREIGN PATENT DOCUMENTS

| | | | | | |
|---|---|---|---|---|---|
| DE | 2333589 | A1 | | 2/1975 | |
| DE | 102011051224 | A1 | | 12/2012 | |
| EP | 2591923 | A2 | | 5/2013 | |
| FR | 3026347 | A1 | | 4/2016 | |
| JP | 06-001119 | A | * | 1/1994 | ........ B60C 11/0302 |
| JP | 06-024212 | A | * | 2/1994 | |
| JP | H06191231 | A | | 7/1994 | |
| JP | 07-172114 | A | * | 7/1995 | ............ B60C 11/13 |
| JP | H08282213 | A | | 10/1996 | |
| JP | 2000-225813 | A | * | 8/2000 | ......... B60C 11/1369 |
| JP | 2001187517 | A | | 7/2001 | |
| JP | 2010208428 | A | | 9/2010 | |
| JP | 2010-254033 | A | * | 11/2010 | |
| KR | 2006-0065297 | A | * | 6/2006 | |
| KR | 2011-0064552 | A | * | 6/2011 | |
| KR | 2020-0121049 | A | * | 10/2020 | |
| WO | 2011073312 | A1 | | 6/2011 | |

OTHER PUBLICATIONS

Machine translation for Japan 07-172114 (Year: 2024).*
Machine translation for Japan 2000-225813 (Year: 2024).*
Machine translation for Korea 2020-0121049 (Year: 2024).*
Machine translation for Korea 2011-0064552 (Year: 2024).*
Machine translation for Korea 2006-0065297 (Year: 2024).*
Machine translation for Japan 06-001119 (Year: 2024).*
Machine translation for Japan 2010-254033 (Year: 2025).*
China National Intellectual Property Administration, Search Report in Application No. CN2021800341254 dated Sep. 18, 2025 2 pages.
"Development and Current Status of Snow Removal Machinery in Japan", Published 1996, 5 pages.

* cited by examiner

SNOW PERFORMACE

WET PERFORMACE 38    40

TIRE

The present invention relates to tires, and more particularly to snow tires.

In snowy conditions, snow collects in the grooves of a tire during rolling. During acceleration or cornering, the snow can slide within the groove. This means that the sliding snow provides very little grip on the snow on the road surface. Hitherto it has been desirable to keep the grooves clear so that water can drain from the grooves easily in wet conditions.

European patent no. 3100873 discloses a tire with protrusions located on the bottom wall of a groove in the tire tread. The protrusions are intended to improve grip on snow without greatly affecting water flow. KR1020040104118A discloses a tire with a device in a groove to prevent the snow entering the groove. However, these arrangements leave room for improvement.

The present invention aims to mitigate at least one problem of the prior art.

A first aspect of the present invention provides a tire comprising: a tread with a groove, the groove having a snow trapping device in it adjacent to a wall of the groove, the snow trapping device having a first surface facing a first side in the groove longitudinal direction, the first surface being configured to trap snow flowing from the first side in the groove longitudinal direction, and the device having a second surface facing a second side in the groove longitudinal direction which is opposite to the first side, the second surface being inclined so as to direct water flowing from the second side away from the wall to which the snow trapping device is adjacent, wherein parts of the device overlap along the groove longitudinal direction so as to form a passageway for water through the device in the groove longitudinal direction, and wherein, in a plan view of the tread, at least half of the device is positioned between the side walls of the groove.

The first surface acts to trap snow flowing from the first side, and the second surface acts to allow water to flow smoothly round the snow trapping device. The snow trapped by the first surface has two effects: firstly, some of the snow sliding in the groove encounters the first surface which stops the snow sliding any further; secondly, other of the snow, which is above the snow trapping device, does not encounter the first surface but is subject to shear stress from the snow that has been trapped. The shear stress slows the sliding of that portion of snow. The overall effect is to slow down the whole pack of snow which improves snow compression and overall grip.

Prior art snow trapping devices tend to cause flow separation and recirculation downstream of the device, which results in increased hydrodynamic drag and flow losses and reduced water drainage. In contrast, in the first aspect of the present invention, the passageway for water through the device reduces flow separation and recirculation downstream of the device, thereby improving water flow and drainage. Specifically, the water flow encountering the device is divided into two main flows. One is channelled inside the passageway, and the other flows over the snow trapping device. The flow channelled inside the passageway creates a water pressure gradient which reduces creation of the recirculation region.

KR1020040104118A discloses a tire with device in a groove to prevent snow entering the groove. The device is positioned in a circumferential direction groove and a width direction groove at the point where the two grooves cross each other. According to FIG. 2, only a small portion of the device is positioned between the side walls of either groove, and most is positioned at the intersection of the grooves. This means that the device blocks water flow along both intersecting grooves. In contrast, the device of the first aspect of the present invention does not block the water flow so much. By providing that at least half of the device is positioned between the side walls of the groove in a plan view of the tread, water drainage is improved because less of the intersection between two grooves is blocked.

In addition, during cornering, for example, it can be desirable for snow to be diverted into circumferential grooves from intersecting grooves to increase the amount of snow trapped and therefore snow-snow grip. Since the device of KR1020040104118A blocks most of the intersection point, the amount of snow that can be diverted will be limited. In contrast, in the present invention, the device, or snow trapped by the device in the groove, can divert more snow into an intersecting groove at the intersection point, thereby improving grip on snow.

Alternatively, in the first aspect, instead of the feature that at least half of the device is positioned between the side walls of the groove, the feature that the snow trapping device extends at most halfway across the area of the groove may be provided. This feature provides improved water drainage in comparison to the prior art, for the following reasons. In KR1020040104118A, the device extends more than halfway across the area of the groove from the bottom wall of the groove. This means the device provides a large blocking effect on water flowing in the groove, which reduces drainage. In contrast, by the snow trapping device extending at most 50% of the way across the area of the groove, the device does not block so much of the area of the groove, which improves water drainage.

Preferably, when the snow trapping device passes through the contact patch of the tire, the parts which overlap are joined to or in contact with each other so that the passageway is formed between the joining or contact point and the adjacent wall. In this way, an "outer" joining or contact point may be formed.

The joining or contact point may be formed at the apex of the snow trapping device.

Preferably, a sipe is provided at the contact point which allows the parts to contact each other. The sipe opens when the snow trapping device is outside the contact patch, and closes when the snow trapping device enters the contact patch.

The sipe may be at the apex of the snow trapping device.

Alternatively, the parts which overlap may be joined to each other by being integrally formed at the joining point.

Preferably, the parts which overlap are joined to each other so that a joining point is formed between the passageway and the adjacent wall. In this way, an "inner" joining point may be formed. To achieve this, the parts may be integrally formed at the "inner" contact point.

It is preferable that the parts of the device which overlap in the groove longitudinal direction are integrally formed.

Preferably, the parts of the device which overlap in the groove longitudinal direction extend along the groove longitudinal direction from the same start point, and preferably to the same end point.

Preferably, the passageway comprises a hole in the device.

Preferably, a maximum dimension of the hole orthogonal to the groove longitudinal direction is less than half the depth of the snow trapping device. For example, a maximum dimension of the hole may be preferably less than 1 mm, when for example the depth of the snow trapping device is 2 mm and, for example, the depth of the groove is 8 mm. This helps to prevent snow passing through the hole.

The hole may be circular in cross-section.

Preferably, the passageway comprises a sipe. In the present specification, a sipe is a groove that closes when it passes through the contact patch of the tire.

The sipe may be formed outside the hole in a tire radial direction, and may adjoin the hole. The sipe helps to simplify the manufacturing process by allowing the hole to be formed more easily during moulding of the tire.

Preferably, in tread plan view, the passageway is substantially parallel with the groove longitudinal direction. Preferably, in a cross-sectional view along the groove longitudinal direction, the passageway is substantially parallel with the groove longitudinal direction. When the passageway is substantially parallel with the groove longitudinal direction in these two views, the passageway follows the flow streamline, which reduces resistance to flow.

Preferably, the passageway comprises a hole formed in the second surface.

Preferably, the passageway comprises a hole formed the first surface.

The passageway may have a substantially constant cross-sectional area along its length.

Preferably, the snow trapping device is attached to a bottom wall and/or a side wall of the groove.

A second aspect of the present invention provides a tire comprising: a tread with a groove, the groove having a snow trapping device in it adjacent to a wall of the groove, the snow trapping device having a first surface facing a first side in the groove longitudinal direction, the first surface being configured to trap snow flowing from the first side in the groove longitudinal direction, and the device having a second surface facing a second side in the groove longitudinal direction which is opposite to the first side, the second surface being inclined so as to direct water flowing from the second side away from the wall to which the snow trapping device is adjacent, wherein the snow trapping device is attached to both a bottom wall and a side wall of the groove.

The fact that the snow trapping device is attached to both a bottom wall and a side wall of the groove means that the device is securely attached and is less likely to become detached from the groove than in the prior art. For example, in European patent no. 3100873 the protrusions are only attached to the bottom wall of the groove.

Preferably, the snow trapping device is attached to both side walls of the groove.

Preferably, the second surface is inclined by less than 45°, more preferably less than 30°, with respect to the wall to which the snow trapping device is adjacent. This avoids abrupt changes of direction of the water flow to provide a smooth flow.

Preferably, the second surface directs water flowing from the second side outwards in a tire radial direction.

Preferably, the second (inclined) surface directs water flowing from the second side away from the bottom wall of the groove.

Preferably, the whole of the device is positioned between the side walls of the groove.

Preferably, at least half of the first (snow trapping) surface of the device (which may be in more than one part) when viewed along the groove width direction does not face outwards in the tire radial direction. This means the snow is not directed outwards in the tire radial direction and is trapped more effectively.

It is preferable that the apex of the snow trapping device extends from one side wall to the other at a constant height.

Preferably, the first (snow trapping) surface extends in a direction which is substantially parallel to the groove width direction. This helps to trap snow more effectively.

Preferably, the first (snow trapping) surface extends at a right angle to the bottom wall and/or a side wall of the groove. This helps to trap snow more effectively.

Preferably, the first surface is planar.

Preferably, the first (snow trapping) surface which is planar is normal to the groove longitudinal direction.

Preferably, the second surface is planar.

Preferably, the second surface is inclined so as to direct water flowing from the second side only in the direction away from the wall to which the snow trapping device is adjacent. This means the water is not directed in a direction along the adjacent wall.

Preferably, the groove is a width direction groove. Here, "width direction groove" means the groove extends in the width direction, but does not need to extend exactly parallel to the width direction.

When the groove is a width direction groove, the snow trapping device improves grip during cornering, when the snow tries to slide in the tire width direction.

Preferably, the groove is provided in the tire shoulder region. "Tire shoulder region" means the region between the tread end and a point halfway to the tire equatorial plane from the tread end.

Preferably, the tire is a pneumatic tire. Preferably, the tire is a snow tire or an all-season tire. Preferably, in a plan view of the tread, the tire has a V-shaped groove, and the snow trapping device is located in the V-shaped groove.

Preferably, the first side is the outside in the tire width direction. Hence the second side is the inside in the tire width direction. "Outside" means outside with respect to the tire equatorial plane.

When the first side is the outside in the tire width direction, and hence the second side is the inside in the tire width direction, the second surface allows water to flow smoothly round the snow trapping device towards the outside with respect to the tire equatorial plane. This is the predominant flow direction of water drainage in the width direction grooves.

Preferably, the snow trapping device is located at least 25% of the length of the groove section in which it is positioned from an end of the groove section. A groove section is measured from a point where the groove meets another groove or the tread end.

Preferably, when viewed in the groove longitudinal direction, the snow trapping device extends at least 25% or at least 30% of the way across the area of the groove from the wall to which the device is adjacent. With this feature, a minimum level of snow trapping can be achieved.

Preferably, the depth of the snow trapping device is at least 25% or at least 30% of the depth of the groove. Preferably, when viewed in the groove longitudinal direction, the snow trapping device occupies at least 25% or at least 30% of the area of the groove. With these two features, a minimum level of snow trapping can be achieved.

Preferably, when viewed in the groove longitudinal direction, the device occupies at most 50% of the area of the groove, more preferably at most 40%, more preferably at most 30%.

Preferably, when viewed in the groove longitudinal direction, the device extends at most halfway across the area of the groove from the wall to which the snow trapping device is adjacent. In KR1020040104118A, the device extends more than halfway across the area of the groove from the bottom wall of the groove. This means the device provides a large blocking effect on water flowing in the groove, which reduces drainage. In the preferred embodiment of the present invention, in contrast, by the snow trapping device extending at most 50% of the way across the area of the groove, the device does not block so much of the area of the groove, which improves water drainage.

More preferably, the device extends across at most at most 40% of the way across the area of the groove from the wall to which the device is adjacent, more preferably at most 30%.

Preferably, the depth of the device is at most 50% of the depth of the groove, more preferably at most 40%, more preferably at most 30%.

When the device occupies or extends across less of the area of the groove in this way, the device provides less hindrance to the flow of water along the groove. Also, restricting the depth of the device helps to improve fatigue resistance and wear resistance. This is because the device is less likely to contact the road surface during running.

Preferably, a maximum dimension of the passageway orthogonal to the groove longitudinal direction is less than half the depth of the snow trapping device. For example, a maximum dimension of the passageway may be preferably less than 1 mm, when for example the depth of the snow trapping device is 2 mm and, for example, the depth of the groove is 8 mm. This helps to prevent snow passing through the passageway.

The optional features of the first aspect mentioned above are applicable to the second aspect, and vice versa.

A preferred embodiment of the present invention will now be described, purely by way of example, with reference to the drawings in which.

Figure 1:
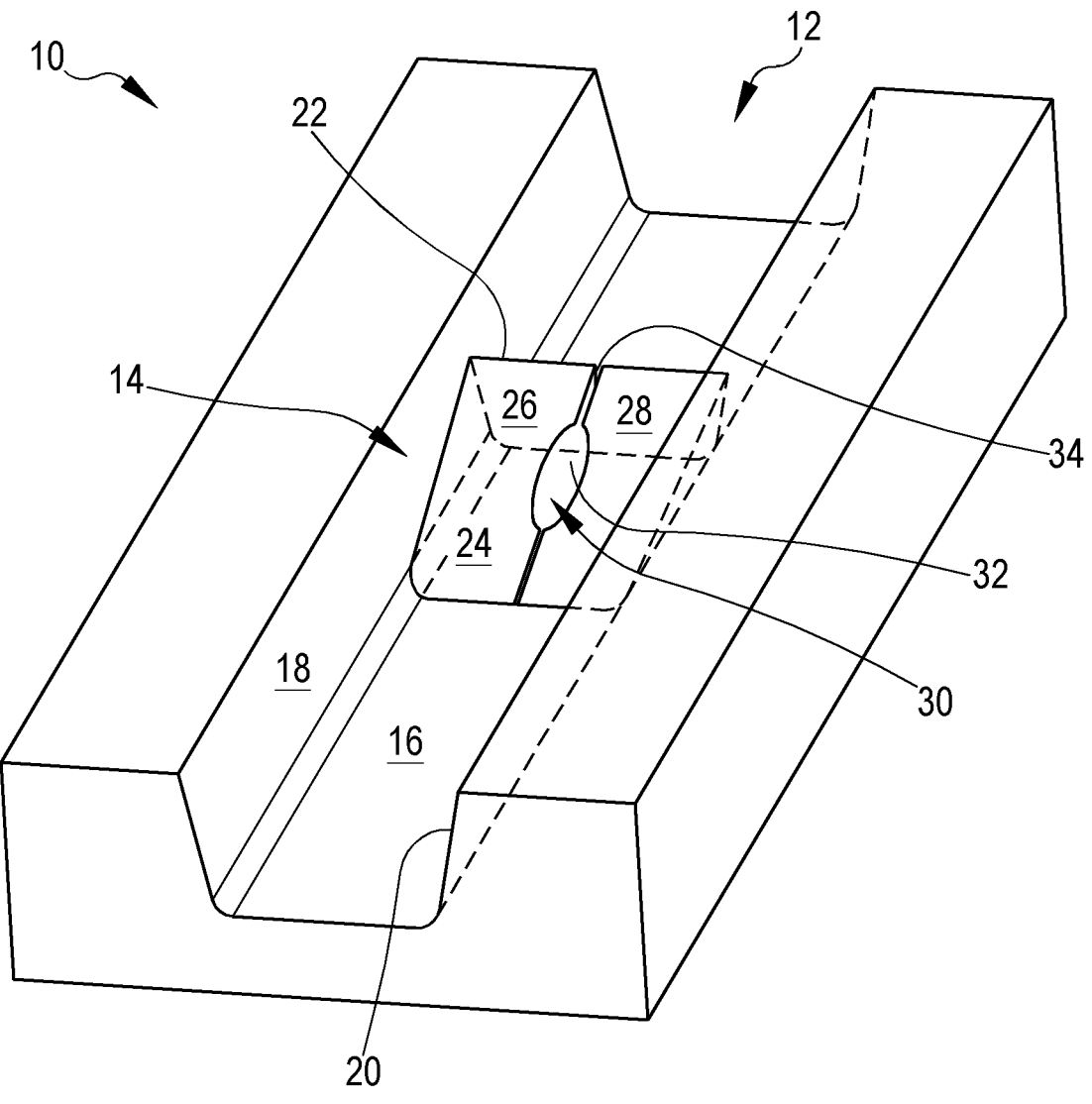
FIG. 1 is an isometric view of a groove with a snow trapping device of a tire according to a preferred embodiment of the present invention.

Referring to FIG. 1, a portion of a tire tread 10 is shown. The tread 10 has a groove (lug) 12 having a snow trapping device in the form of a dam 14 in it. In the present embodiment, the snow trapping device 14 is adjacent to, and attached to, a bottom wall 16 of the groove 12, as well as being adjacent to and attached to a left-hand side wall 18 and a right-hand side wall 20 of the groove 12.

The groove 12 and snow trapping device 14 are shown when they are not in the contact patch of the tire.

The dam 14 has a first, snow trapping surface 22 facing a first side in the groove longitudinal direction. In FIG. 1, the first side of the dam 14 is towards the top of FIG. 1. The first, snow trapping surface 22 is configured to trap snow flowing from the first side in the groove longitudinal direction.

The dam 14 has a second, inclined surface 24 facing a second side in the groove longitudinal direction which is opposite to the first side. In FIG. 1, the second side of the dam 14 is towards the bottom of FIG. 1. The second, inclined surface 24 is inclined so as to direct water flowing from the second side away from the wall to which the snow trapping device is adjacent. In the present embodiment, the surface 24 is inclined with respect to the bottom wall 16 of the groove 12, and directs the flow of water away from the bottom wall 16. The surface 24 does not direct the flow of water away from the side walls 18 and 20 of the groove 12.

It can be seen from FIG. 1 that the dam 14 has a left-hand part 26 and a right-hand part 28. In the present embodiment, the parts 26 and 28 are integrally formed, but this is not essential. In FIG. 1, the parts 26 and 28 are divided by a dotted line. The parts 26 and 28 overlap along the groove longitudinal direction so as to form a passageway 30 for water through the dam 14 in the groove longitudinal direction.

It is also shown in FIG. 1 that the whole of the dam 14 is positioned between the side walls 18 and 20 of the groove 12.

In the present embodiment, the passageway 30 comprises a hole 32 and a sipe 34 which pass through the middle of the dam 14 in the groove width direction. The hole 32 adjoins the sipe 34, and the hole 32 is nearer to the bottom wall 16 of the groove 12 than the sipe 34. The hole 32 passes through the inclined surface 24 and the snow trapping surface 22, and the axis of the hole 32 is parallel to the groove longitudinal direction. The sipe 34 also passes through the inclined surface 24 and the snow trapping surface 22. The sipe 34 may simplify the manufacturing process by allowing the hole 32 to be formed more easily during moulding of the tire. The sipe 34 is sized to close when it passes through the contact patch of the tire, which prevents loss of flow rate. This closing is due to the block barrelling effect. At that time, the passageway 30 consists of just the hole 32.

In particular, when the dam 14 passes through the contact patch of the tire, the sipe 34 closes so that the parts 26 and 28 contact each other. This means that the passageway 30 consists of just the hole 32, which is formed between the contact point and the bottom wall 16.

The snow trapping surface 22 is planar, with the plane being normal to the groove longitudinal direction. This provides a blunt end of the dam 14 with which to trap snow. The surface 22 extends from the bottom wall 16 of the groove 12, and also, in the present embodiment, from the left side wall 18 to the right side wall 20.

The inclined surface 24 is planar and is inclined with respect to the bottom wall 16 of the groove 12. The surface 24 acts as ramp to lift water up and over the dam 14 in a smooth flow. The angle of inclination of the surface 24 is preferably less than 45°, more preferably less than 30°, to avoid abrupt changes of direction of the water flow and to provide a smooth flow.

The passageway 30 allows water to flow through the dam 14 and acts to reduce flow separation and recirculation downstream of the dam 14 (in particular, downstream of the snow trapping surface 22).

Figure 2:
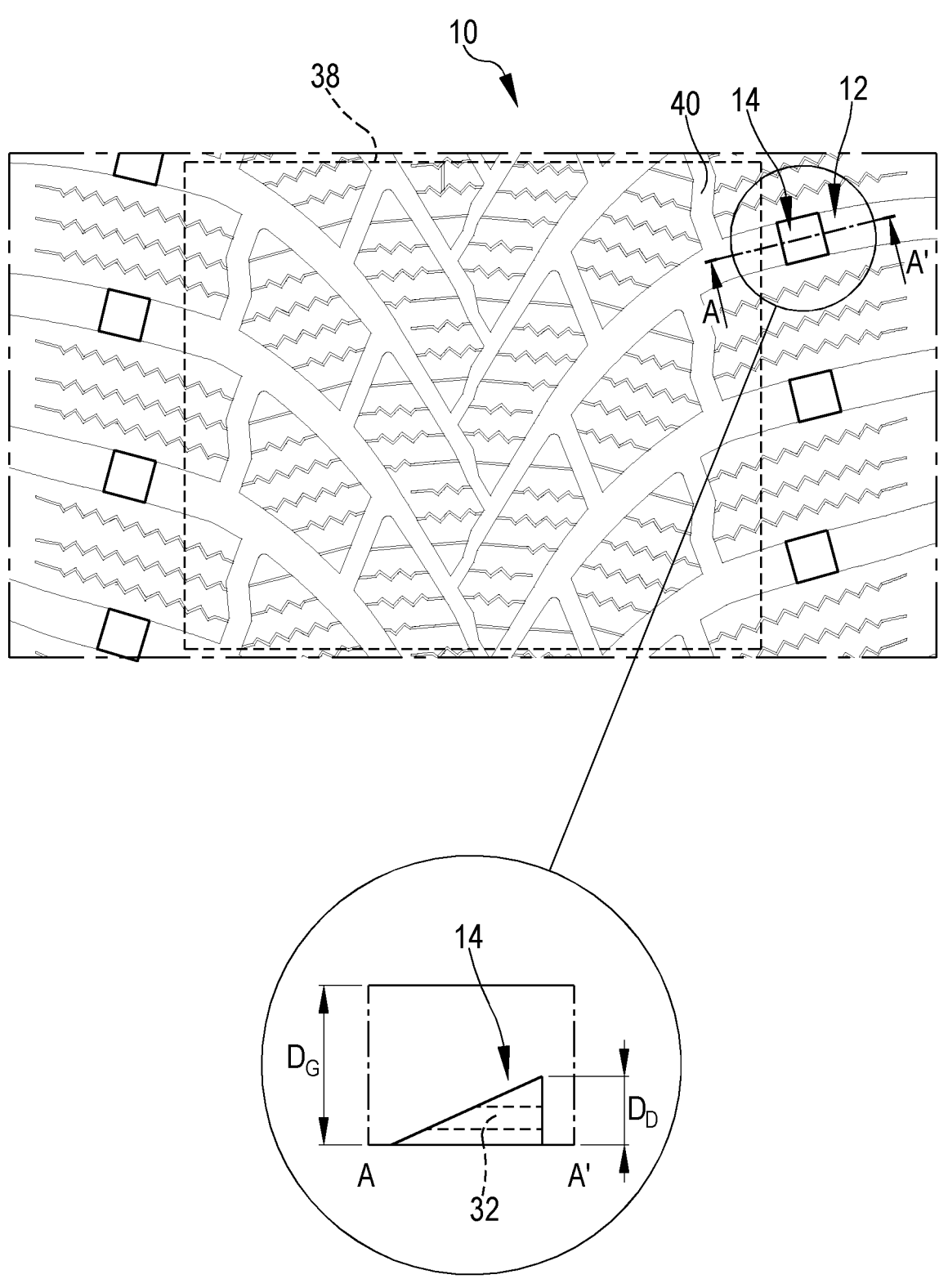
FIG. 2 shows, on the left-hand side, a tread plan view of the tire tread of the tire of the embodiment of FIG. 1, and shows, on the right-hand side, a cross-sectional view taken along line A-A' in the left-hand view.

Referring to FIG. 2, the tire is a snow tire with several sipes provided in each tread block. The tire has a configuration of V-shaped grooves characteristic of a unidirectional tire. The angle of the grooves making up the V shape, with respect to the tire width direction, changes from small to large from the shoulder region to the centre region of the tire. Hence the angle is larger near the tire equatorial plane.

It can be seen from the tread plan view in FIG. 2 that the dam 14 is positioned approximately in the middle in the groove longitudinal direction of the groove section in which it is located. The groove section extends from the tread end to the intersection with a groove (circumferential groove 40) running in the tire circumferential direction. This groove section has a relatively small angle with respect to the tire width direction. Therefore, snow slides particularly in this groove section during cornering. The contact patch 38 is also shown in FIG. 2 with a dotted line.

In the present embodiment, the dam 14 is provided only in the shoulder regions of the tire, and only in tire width direction grooves. However, this is not essential, and the dam 14 may be provided elsewhere in addition or alternatively, possibly in grooves other than tire width direction grooves.

Referring again to FIG. 2, the cross-sectional view along line A-A' shows the inside of the dam 14. The hole 32 is shown, but the sipe 34 is not. $D_G$ denotes the depth of the groove 12, and $D_D$ the depth of the dam 14. The depth $D_D$ of the dam 14 is, in the present embodiment, about 25% of the depth $D_G$ of the groove 12. Accordingly, in the present embodiment, when viewed in the groove longitudinal direction, the dam 14 extends about a quarter of the way across the area of the groove 12 from the bottom wall 16. In the present embodiment, the dam 14 occupies about 2% of the volume of the groove section. As shown, the dam 14 forms a right-angled triangle in cross-section.

Figure 3:
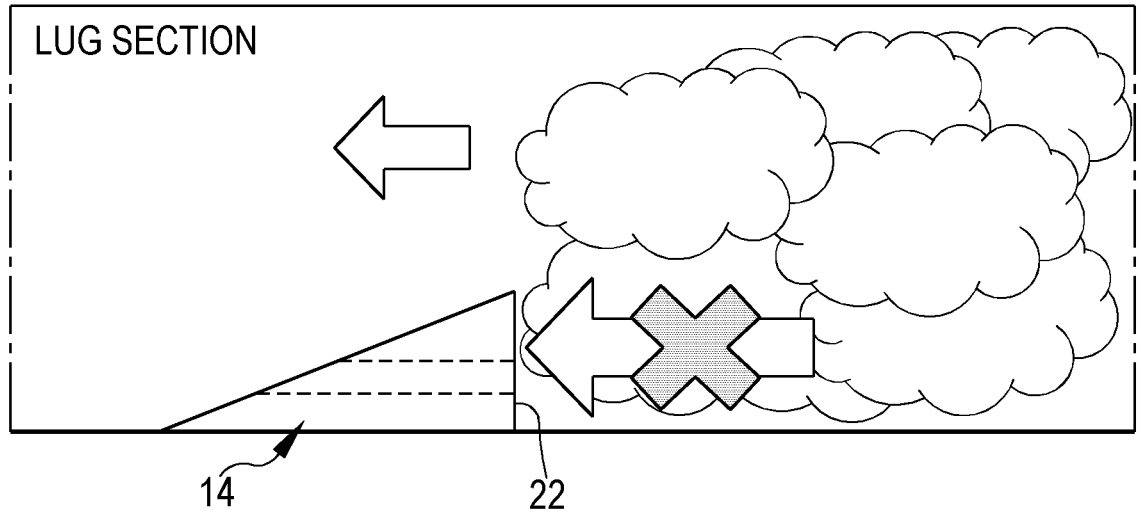
FIG. 3 shows, in the upper view, a schematic cross-sectional view of the groove (lug) of the embodiment of FIG. 1 along the groove longitudinal direction, and in the lower view, a schematic cross-sectional view of a groove (lug) without the snow trapping device.
Figure 3:
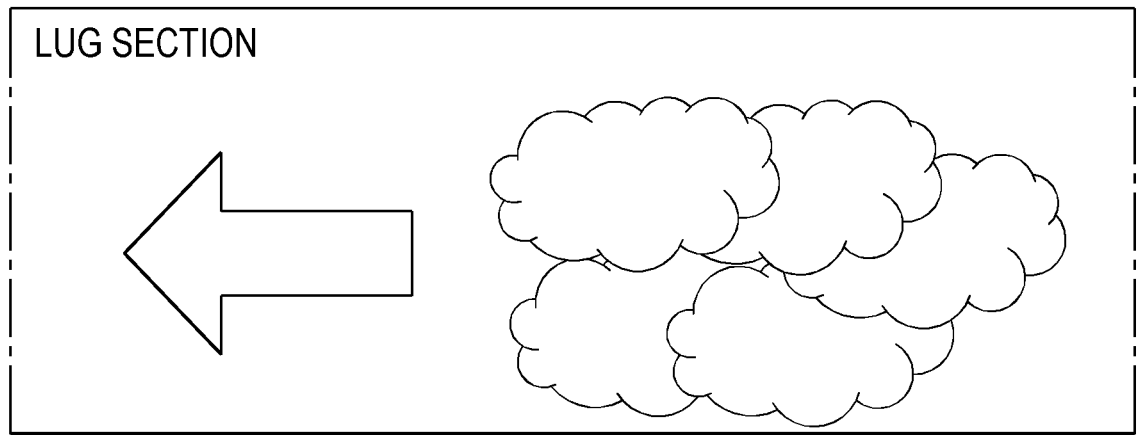

FIG. 3 illustrates schematically the snow performance of the tire of the preferred embodiment, in comparison to a tire without a snow trapping device.

In the upper view of FIG. 3, snow flowing along the groove 12 from right to left encounters the dam 14. The depth of the dam 14 is less than the depth of the groove 12. The lower layer of snow encounters the snow trapping surface 22 which prevents the snow flowing any further. The upper layer of snow does not encounter the surface 22, but nevertheless its flow is slowed because of the shear force from the lower layer of snow which has been trapped by surface 22.

In the lower view of FIG. 3, in contrast, the snow can flow unimpeded along the groove.

Figure 4:
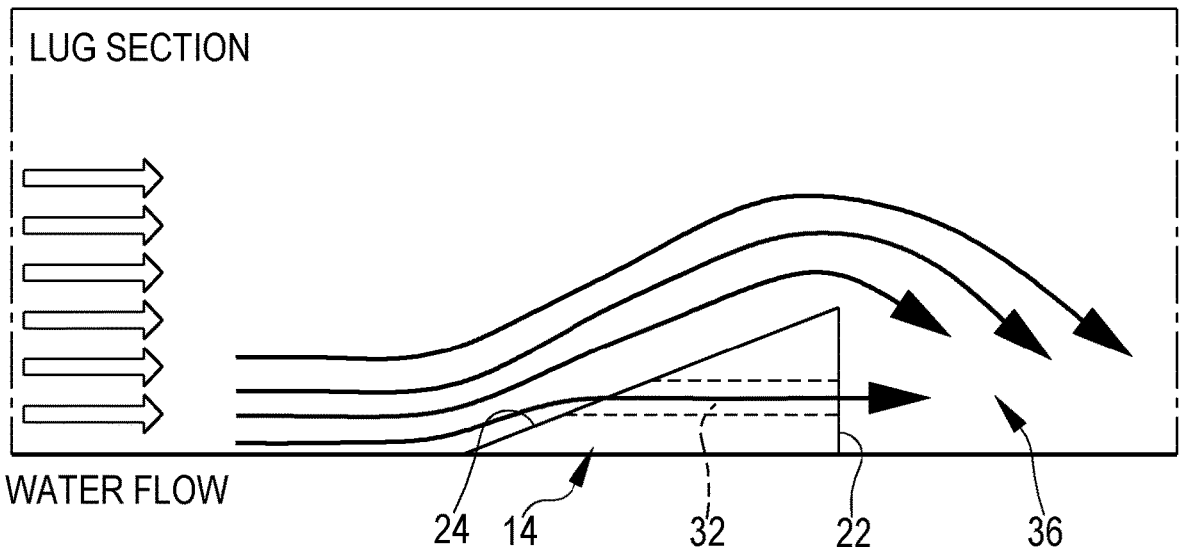
FIG. 4 shows a schematic cross-sectional view of the groove (lug) of the embodiment of FIG. 1 along the groove longitudinal direction.

FIG. 4 illustrates schematically the wet performance of the tire of the preferred embodiment.

In FIG. 4, water flowing along the groove 12 from left to right encounters the dam 14 and in particular the inclined surface 24. The surface 24 directs the flow upwards and away from the bottom wall 16 of the groove 12. Some of the water then flows through the hole 32 parallel to the groove longitudinal direction. The majority of the water continues up the inclined surface 24 and over the top of the dam 14 and then down towards the bottom wall 16 of the groove 12. A recirculation region 36 is shown downstream of the snow trapping surface 22. The flows of water meet in this recirculation region 36, and the flow which has passed through the hole 32 reduces the size of the recirculation region in comparison to the case where there is no flow through the dam 14. This reduces flow losses and improves water drainage from the tire.

Computer simulations were carried out to model the snow and wet performance of the tire according to the preferred embodiment of the present invention but without the passageway 30. The simulations for the snow performance modelled the tire turning 20° during cornering. The results of the simulations for the snow performance are shown in FIGS. 5 and 6.

Figure 5:
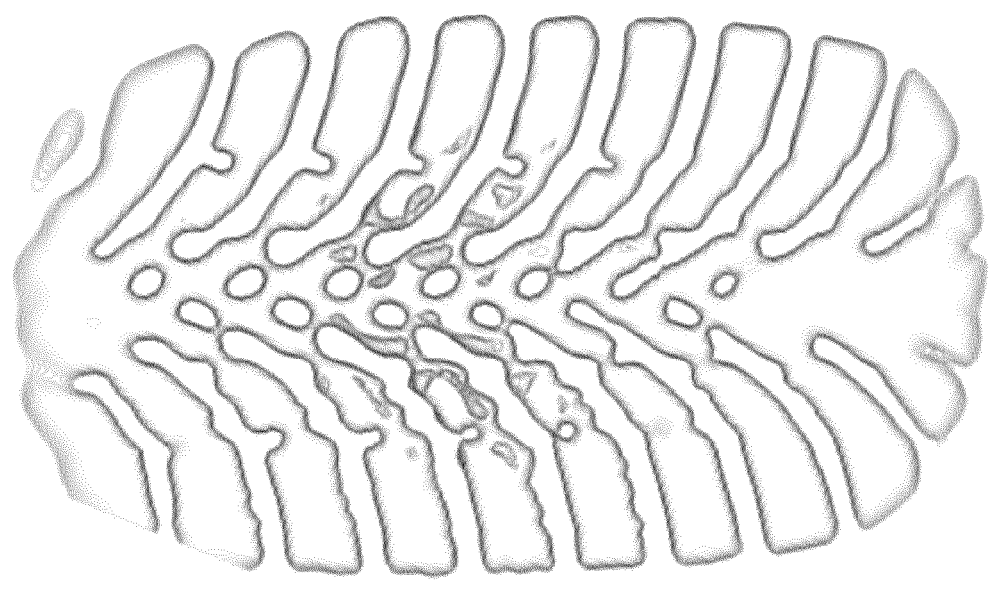
FIG. 5 is a plan view plot showing the snow density on the tire tread of a tire without a snow trapping device.
Figure 6:
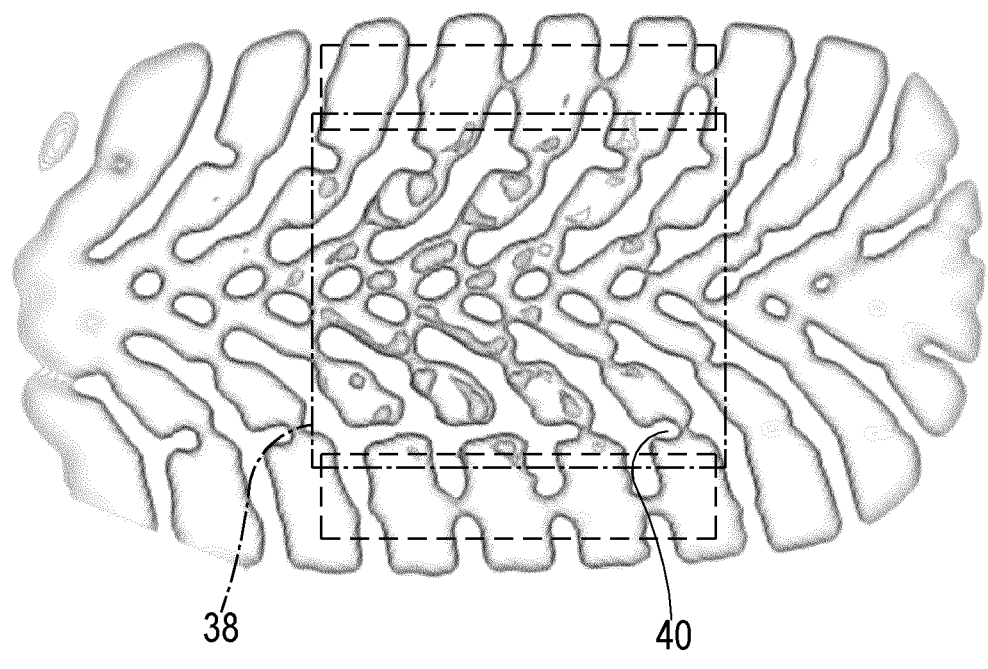
FIG. 6 is a plan view plot showing the snow density on the tire tread of a tire with a snow trapping device according to the embodiment of FIG. 1.

FIG. 5 shows the snow density on the tire tread of a tire without a snow trapping device, and FIG. 6 shows the snow density on the tire tread of a tire with a snow trapping device according to the embodiment of FIG. 1.

In FIGS. 5 and 6, contour lines join points of equal snow density. In FIG. 6, the area inside the dashed boxes contains the dams 14, and these areas have a low density where the dams 14 are, but have areas of higher snow density around the dams 14 than the corresponding areas in FIG. 5. In FIG. 6, the shape of the contour lines shows that the snow density is high in the circumferential groove 40 as well as in the adjacent tire width direction groove. By comparing FIGS. 5 and 6, it can be seen that the snow density in the circumferential groove 40 in FIG. 6 is higher than in the corresponding area in FIG. 5.

The results show an increase of about 22% in lateral force when the dams 14 are present in comparison to the case where they are not.

The results also showed an increase in the amount of snow flowing into the circumferential direction grooves intersecting the groove section in which the dam 14 is located. This contributed to an improvement in grip in the snow. The flow into these circumferential grooves has the following mechanism. During cornering, snow in the contact patch is subject to a force with a component in the width direction of the tire but also with a component in the circumferential direction. (During traction, the circumferential component is upwards in FIG. 2, and left to right in FIGS. 5 and 6). The component in the circumferential direction causes the snow to flow towards the groove section in which the dam 14 is located. However, the snow trapped by the dam 14 causes the snow from the contact patch to be diverted into the circumferential groove 40. This increases the snow density in the circumferential groove 40 and the snow gripping effect.

As for wet performance, the simulations did not show any significant change in performance due to the presence of the dams 14. However, the simulations were carried out with the assumption that the flow was both inviscid and laminar, because of the technical limitations of the simulation equipment. In reality, it is known that the recirculation region downstream of the dam 14 will be mainly due to viscous and turbulence effects. Therefore, it is to be expected that, in reality, the wet performance will be significantly worse than the simulations show, and also that the presence of the passageway 30 will beneficial to counteract the recirculation.

Figure 7:
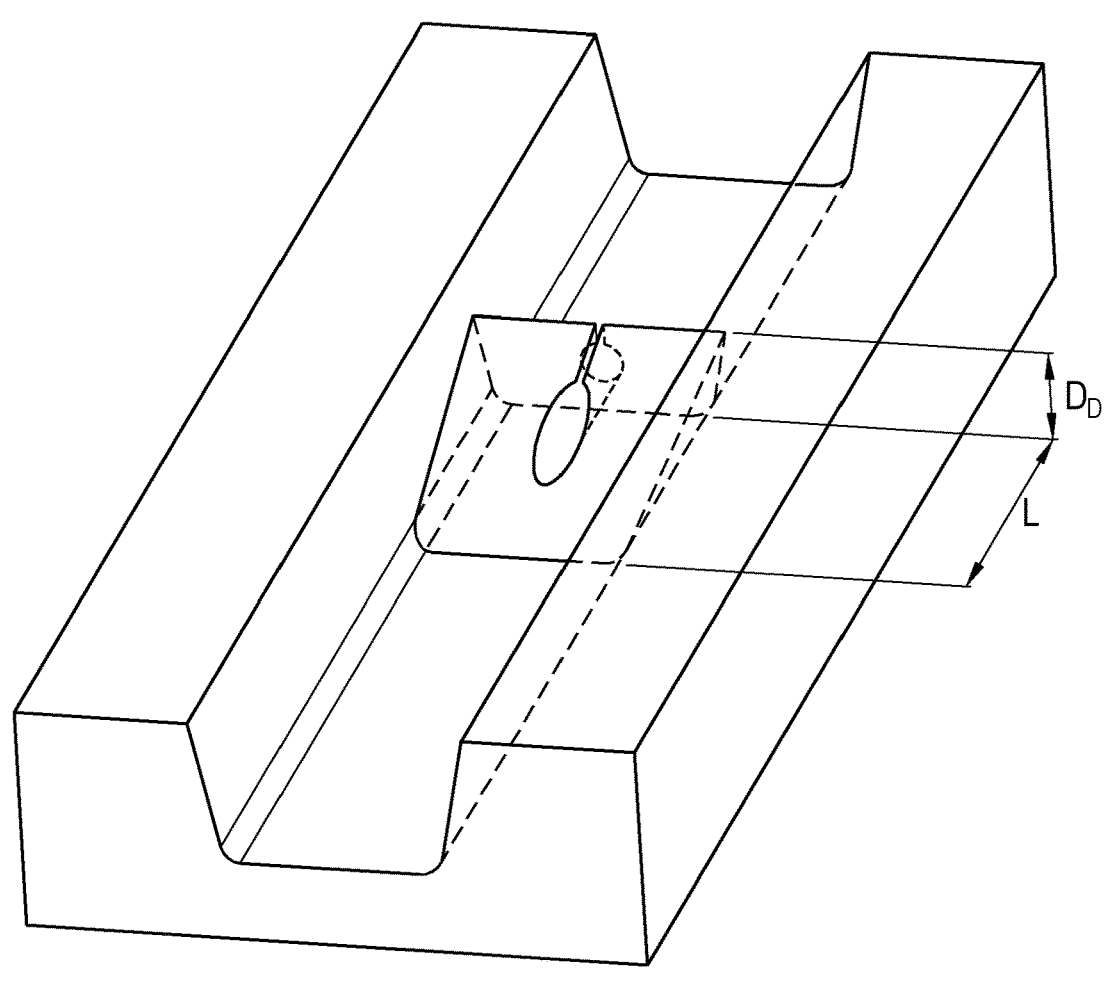
FIG. 7 is an isometric view of a groove of FIG. 1.
Figure 8:
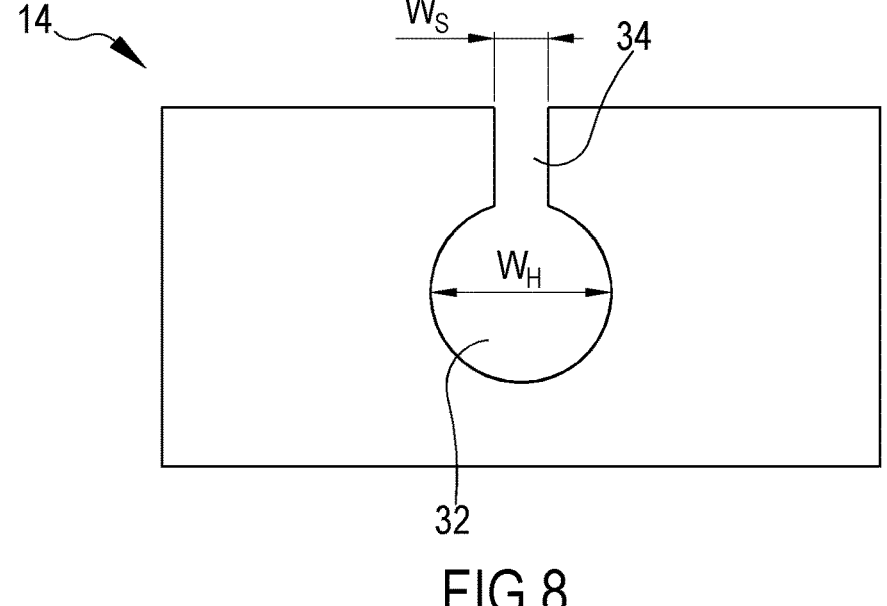
FIG. 8 is an elevation view along the groove longitudinal direction of the snow trapping device.

An explanation of the preferred dimensions of the features of the snow trapping device (dam) 14 will be made with reference to FIGS. 7 and 8. The dimensions are as follows:

$D_D$ (Depth of dam 14): 2 mm

L (Length of dam 14): 4 mm $W_S$ (Width of sipe 34): 0.4 mm $W_H$ (Width of hole 32): 1 mm The dimensions $D_D$ and L mentioned above were used in the simulations, but $W_S$ and $W_H$ were not (because no passageway 30 was modelled in the simulations).

In the present embodiment, when viewed in the groove longitudinal direction, the dam 14 extends about a quarter of the way across the area of the groove 12 from the bottom wall 16. However, this is not essential. In addition, in the present embodiment, the dam 14 occupies about 2% of the volume of the groove section, but again this is not essential.

A tire tread 10 has a groove 12 having a snow trapping device in the form of a dam 14 in it. The dam 14 is attached to a bottom wall 16 of the groove 12, and to side walls 18, 20 of the groove 12. The dam 14 has a first, snow trapping surface 22 and a second, inclined surface 24 which face in opposite sides in the groove longitudinal direction. The second, inclined surface 24 directs the flow of water away from the bottom wall 16. A hole 32 and a sipe 34 form a passageway 30 for water through the dam 14 in the groove longitudinal direction. The passageway reduces water flow recirculation. The whole of the dam 14 is between the side walls 18, 20 of the groove 12.

The invention claimed is:

1. A tire comprising:

a tread with a groove, the groove having a snow trapping device attached to a bottom wall and to opposing side walls of the groove, the snow trapping device having:

a planar first surface facing a first side in a groove longitudinal direction, the first surface extending at right angles with respect to each of the bottom wall and the opposing side walls; and a planar second surface facing a second side opposite the first side in the groove longitudinal direction, the second surface being inclined from the bottom wall to an apex of the first surface, wherein parts of the snow trapping device overlap along the groove longitudinal direction to form a passageway for water through the device in the groove longitudinal direction, wherein the passageway comprises a sipe and a hole extending through the first surface and the second surface in the snow trapping device, the sipe being formed outside the hole in a tire radial direction and adjoining the hole, wherein when the snow trapping device passes through a contact patch of the tire, the parts which overlap are joined to, or in contact with, each other wherein the passageway is formed between a joining point or a contact point and the bottom wall and the sipe is provided at the contact point which allows the parts to contact each other, wherein the height of the snow trapping device is less than the depth of the groove.

2. The tire of claim 1, wherein the parts of the device which overlap in the groove longitudinal direction are integrally formed.

3. The tire of claim 1, wherein:

when viewed in the groove longitudinal direction, the snow trapping device extends at most halfway across an area of the groove from the bottom wall.

4. The tire of claim 1, wherein the second surface directs water flowing from the second side outwards in a tire radial direction.

5. The tire of claim 1, wherein the snow trapping device comprises at least twenty-five percent of a length of a groove section in which it is positioned from an end of the groove section.

6. The tire of claim 5, wherein the snow trapping device is located approximately in a middle in the groove longitudinal direction of the groove section in which it is located.

7. The tire of claim 1, wherein a depth of the snow trapping device is at most 50% of a depth of the groove.

8. The tire of claim 1, wherein an angle of inclination for the second surface is less than 30 degrees.

* * * * *